(12) United States Patent
Hoffman et al.

(10) Patent No.: US 7,853,614 B2
(45) Date of Patent: Dec. 14, 2010

(54) HIERARCHICAL, TRACEABLE, AND ASSOCIATION REPUTATION ASSESSMENT OF EMAIL DOMAINS

(75) Inventors: Auren Hoffman, San Francisco, CA (US); Jeremy Lizt, San Francisco, CA (US); Vivek Sodera, San Francisco, CA (US); Manish Shah, San Francisco, CA (US)

(73) Assignee: Rapleaf, Inc., San Francisco, CA (US)

( * ) Notice: Subject to any disclaimer, the term of this patent is extended or adjusted under 35 U.S.C. 154(b) by 360 days.

(21) Appl. No.: 11/945,208

(22) Filed: Nov. 26, 2007

(65) Prior Publication Data

US 2008/0126344 A1    May 29, 2008

Related U.S. Application Data

(60) Provisional application No. 60/861,505, filed on Nov. 27, 2006.

(51) Int. Cl.
*G06F 7/00* (2006.01)
*G06F 17/30* (2006.01)
(52) U.S. Cl. .................................. 707/785; 707/786
(58) Field of Classification Search .................... 707/5, 707/6, 3, 100, 200
See application file for complete search history.

(56) References Cited

U.S. PATENT DOCUMENTS

| | | | |
|---|---|---|---|
| 2002/0065891 A1* | 5/2002 | Malik | 709/206 |
| 2007/0143469 A1* | 6/2007 | Adams et al. | 709/224 |
| 2008/0184366 A1* | 7/2008 | Alperovitch et al. | 726/22 |

* cited by examiner

*Primary Examiner*—Charles Rones
*Assistant Examiner*—Fariborz Khoshnoodi
(74) *Attorney, Agent, or Firm*—Stolowitz Ford Cowger LLC (57) ABSTRACT

A reputability analysis system receives a domain assessment request associated with a domain and accesses a database to find a match for the domain. A reputability score is derived according to a hierarchical analysis of a matching domain in the database. Traceability, accountability, and association information associated with the domain assessment request may also be used to adjust the reputability score.

23 Claims, 6 Drawing Sheets

HIERARCHICAL, TRACEABLE, AND ASSOCIATION REPUTATION ASSESSMENT OF EMAIL DOMAINS

The present application claims priority from provisional patent application Ser. No. 60/861,505, Entitled EMAIL ASSESSMENT SYSTEM AND METHOD, filed Nov. 27, 2006 which is herein incorporated by reference in its entirety.

BACKGROUND

When receiving an email from an unknown sender, the reputability of the email address vis-à-vis the sender can be unclear. Email may be checked against a contacts list, spam whitelist, or spam blacklist. However, these techniques do not assess the characteristics of the email domains.

Any website that accepts content submissions from the public (e.g. blogging sites, social networking sites, publication sites, wikis, etc.) has to find a balance between keeping the site accessible to encourage submissions, and protecting against fraudulent or vandalizing behavior. One example of vandalism is the widespread issue of "wikibots", computer programs that post unwanted and often irrelevant advertising on generally accessible wiki pages.

Wiki websites have 3 basic options: i) leave the site generally open to anonymous users; ii) require users to register with an email address and verify ownership of that email address before posting content; iii) require that content be reviewed before it is posted. Option 1 offers no protection from vandalism. Option 2 makes life a little more difficult for vandals, but is easily overcome. Option 3 is relatively difficult as it is time-intensive and costly to review content.

Some domain registry systems may assign reputation values to different registered internet domains based on user feedback or some computational algorithm. These registry systems only provide reputation information for internet domains registered by that particular registry service. Even the registered domains will not have reputation information unless the registry service receives feedback or data input identifying previous actions associated with the registered domains. When domain feedback or data input is available, the registry service then automatically generates reputation values that correspond with the feedback information. Thus, current domain reputation assignment systems only cover certain internet domains. For example, while a domain registry system may assign a reputation on a .com domain, it cannot compare a .edu or a .gov (or potentially a .cn) domain with a .com The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

Domain hierarchical reputation assessment uses email addresses and knowledge of email domains and how email addresses are distributed within those domains in order to generate a "reputation" or likelihood of good behavior. Email addresses or email address domains are submitted to a system that returns a score representing the "reputability" or "verity" of the email address. The reputability score is determined by checking a database to see if it contains a reputability score for the given domain. Even if there is no listing for that domain, the system will derive a reputability score based on hierarchical analysis of the domain and/or based on the traceability, accountability, or association of the domain users.

These techniques give site operators easy-to-use tools for restraining the privileges of users who come into the site with email addresses of unreputable domains. These tools address the issue of site vandalism by enabling site operators to prevent the malicious contributions of vandals that use email addresses from unreputable email domains. In general, these techniques may be used to evaluate the verity of an email address domain in any applicable context.

BRIEF DESCRIPTION OF THE DRAWINGS

Embodiments of the inventions are illustrated in the figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1:
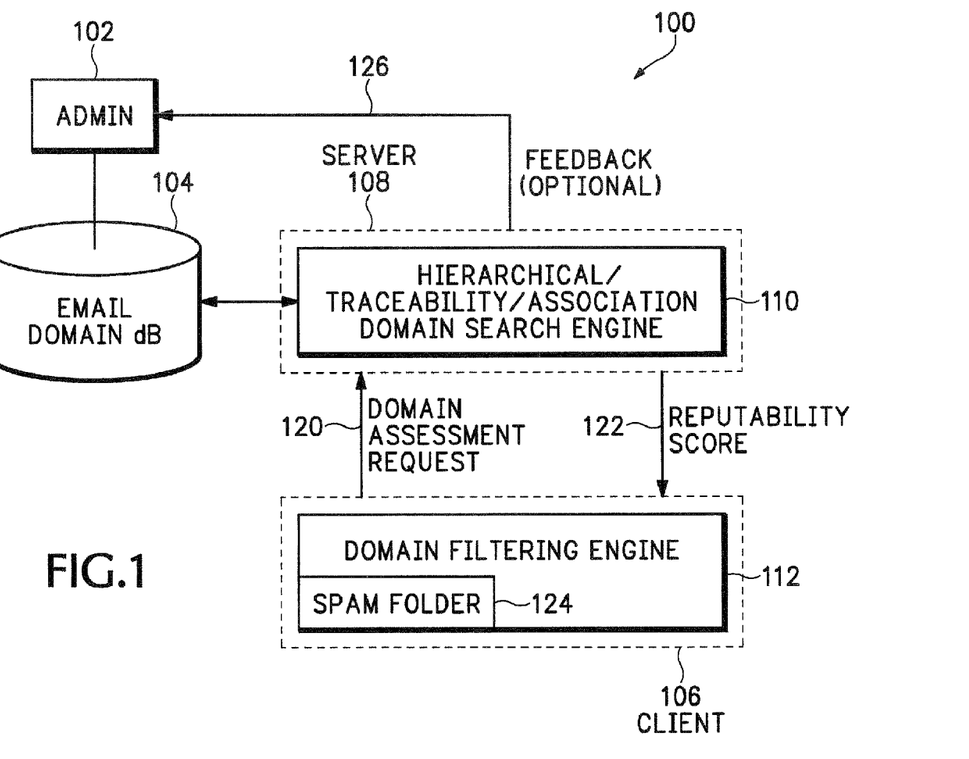
FIG. 1 depicts an example of a system for managing and assessing email reputability.

FIG. 1 depicts an example of a system 100 for assessing email reputability. The system 100 includes an admin 102, an email domain database 104, a client 106, and a server 108. The server 108 includes a hierarchical/traceability domain search engine 110. The client 106 includes a domain filtering engine 112.

Figure 6:
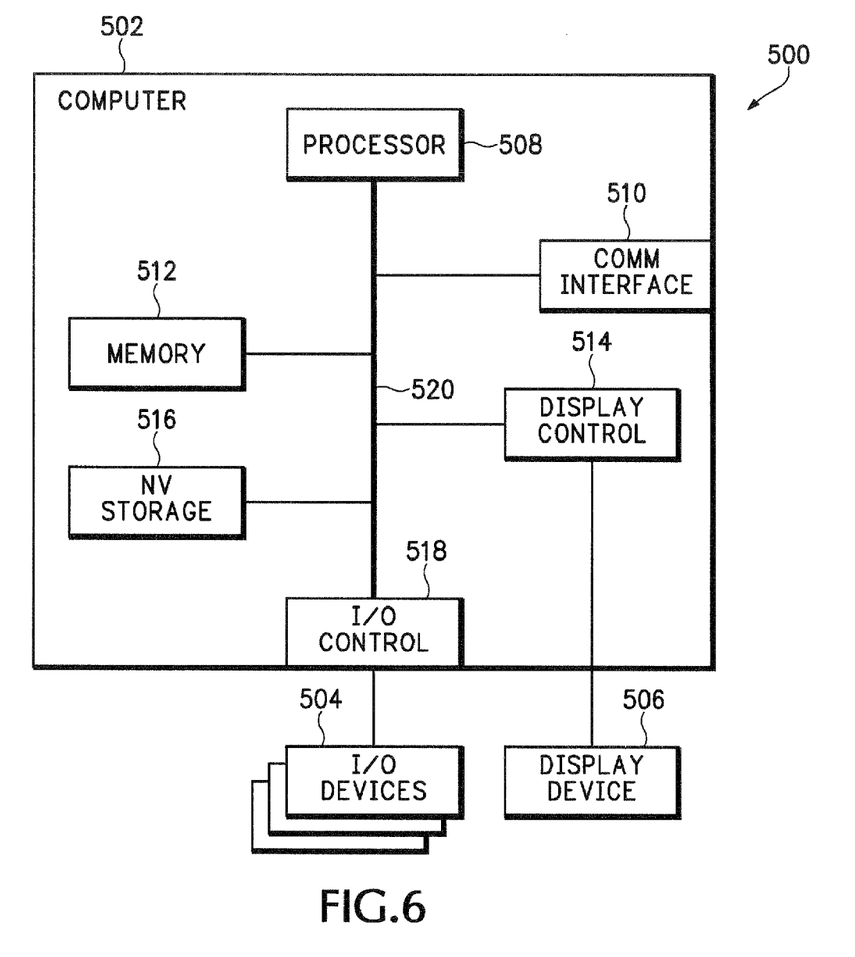
FIG. 6 depicts an example of a computer system appropriate for use in the systems in FIGS. 1-5.

In the example of FIG. 1, the admin 102 may include a known or convenient computer system that is locally, remotely, or otherwise coupled to the email domain database 104. FIG. 6, described later, depicts a computer system suitable for implementation of the admin 102, server 108, and/or client 106.

Domain Hierarchy

Figure 2:
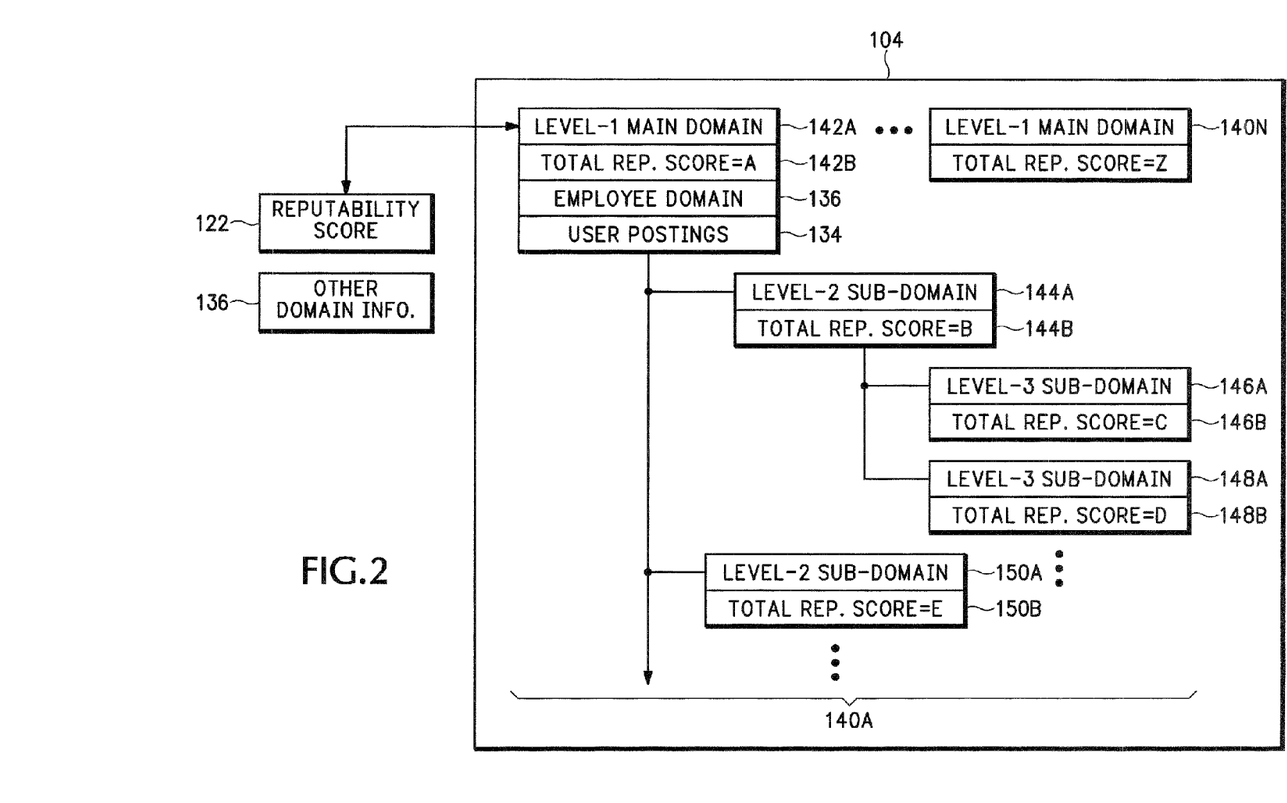
FIG. 2 depicts an example of a database used in the system shown in FIG. 1.

One example of the email domain database 104 is shown in FIG. 2 and includes data associated with different email addresses, in particular different email domains 140. The email domains 140 are structured hierarchically, and have associated reputability scores at different hierarchical levels. The domains 140 while shown hierarchically in FIG. 2 may actually be stored in any of a variety of different ways where different portions of the same domain are linked together.

One particular domain 140A has a level-1/main/master domain 142A with an associated reputability score 142B. The level-1 main domain for example may be extensions such as ".com", ".gov", ".mil", ".edu", ".de", or any other domain entity or domain country used for communicating over the internet. Any number of these hierarchical domains 140A-140N may exist in database 104. The reputability score 142B is shown as a letter A but represents a number.

Different sub-domain levels/extensions branch off of the main domain 142A. For example, the level-2 sub-domains 144A and 150A and associated reputability scores 144B and 150B, respectively, branch off of domain 142A. The sub-domains 144A and 150A may be associated with different businesses, educational institutions, military branches, Internet Service Providers (ISPs), users, etc. Each level-2 sub-domain 144A and 150A may also have one or more sub-domains. For example, level-3 sub-domains 146A and 148A branch off of sub-domain 144A and also may have associated reputability scores 146B and 148B, respectively. Any number of additional sub-domains or extensions can further branch off of the level-3 sub-domains 146A and 148A.

Figure 3:
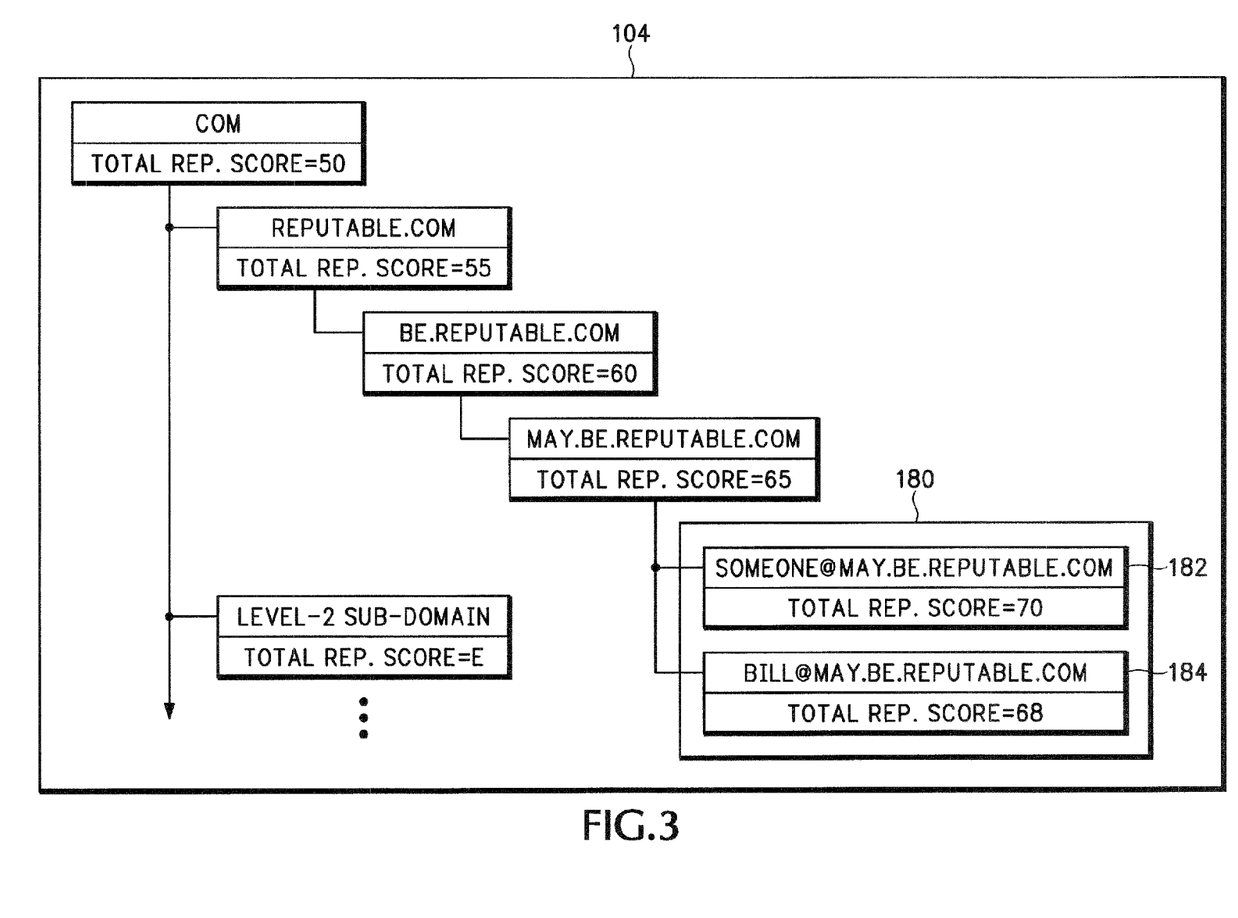
FIG. 3 depicts another example of a database used in the system shown in FIG. 1.

FIG. 3 shows one specific example of an email address domain "someone@may.be.reputable.com" that may be stored in database 104. The master domain ".com" may have an associated reputability score that is relatively uninformative because there are many email addresses that end in ".com" that are not reputable, and many that are reputable. In the email domain database 104, the domain "reputable.com" may have an associated reputability score that is more informative than ".com," but less informative than the sub-domain "be.reputable.com."

Assume that the email domain database 104 does not have the record for "may.be.reputable.com." In this example, "be.reputable.com" may provide the greatest amount of information because it is highest in the domain hierarchy. It should be noted that "be.reputable.com" and "reputable.com" could provide equal amounts of information (e.g., the reputability scores could be the same), but it is unlikely that "reputable.com" would provide more information than "be.reputable.com."

Referring both to FIG. 1 and FIG. 3, the client 106 presumably wishes to make use of the data in the email domain database 104 to assess the reputability of "someone@may.be.reputable.com". Accordingly, the client 106 sends a domain assessment request 120 to the server 108. The server 108 uses the hierarchical/traceability email domain search engine 110 to access the email domain database 104. In alternative embodiments, one or more of the admin 102, the email domain database 104, and the client 106 could be logically or physically included in or local with respect to the server 108.

The hierarchical email domain search engine 110 logically checks the highest hierarchical level for a match. The highest hierarchical level in database 104 for "someone@may.be.reputable.com" is "may.be.reputable.com," If there was no match for "may.be.reputable.com.", the hierarchical email domain search engine 110 would check "be.reputable.com" for a match, then "reputable.com", and finally, ".com".

A value associated with the highest match is returned as the reputability score. Assume for the purpose of example that "be.reputable.com," "reputable.com," and ".com" have reputability scores of 60, 55, and 50, respectively. Since in this example, "be.reputable.com" is the highest match in the domain hierarchy, a value of 60 is sent from the server 108 to the client 106 as reputability score 122.

It is worth noting that the scores can be anything associated with a particular reputability. For example, the domains can alternatively be assigned letter grades, percentage values, color codes, flags, tags, images, audio clips, or any other visual or audio indicator of reputability.

Advantageously, the system 100 can facilitate assessment of reputability or verity of the domain of an email addresses, as described above. In a non-limiting embodiment, the reputability of the domain can, in turn, be used to assess the reputability of the actual email address. For example, in FIG. 3, a manager could determine that "someone@may.be.reputable.com" is deserving of a reputability score that is different from that of "may.be.reputable.com." In such an embodiment, it may be desirable to include in database 104, or include in another database 180, the reputability scores for particular email addresses 182 and 184. The email address database 180 may or may not be logically or physically included in the email domain database 104.

Figure 4:
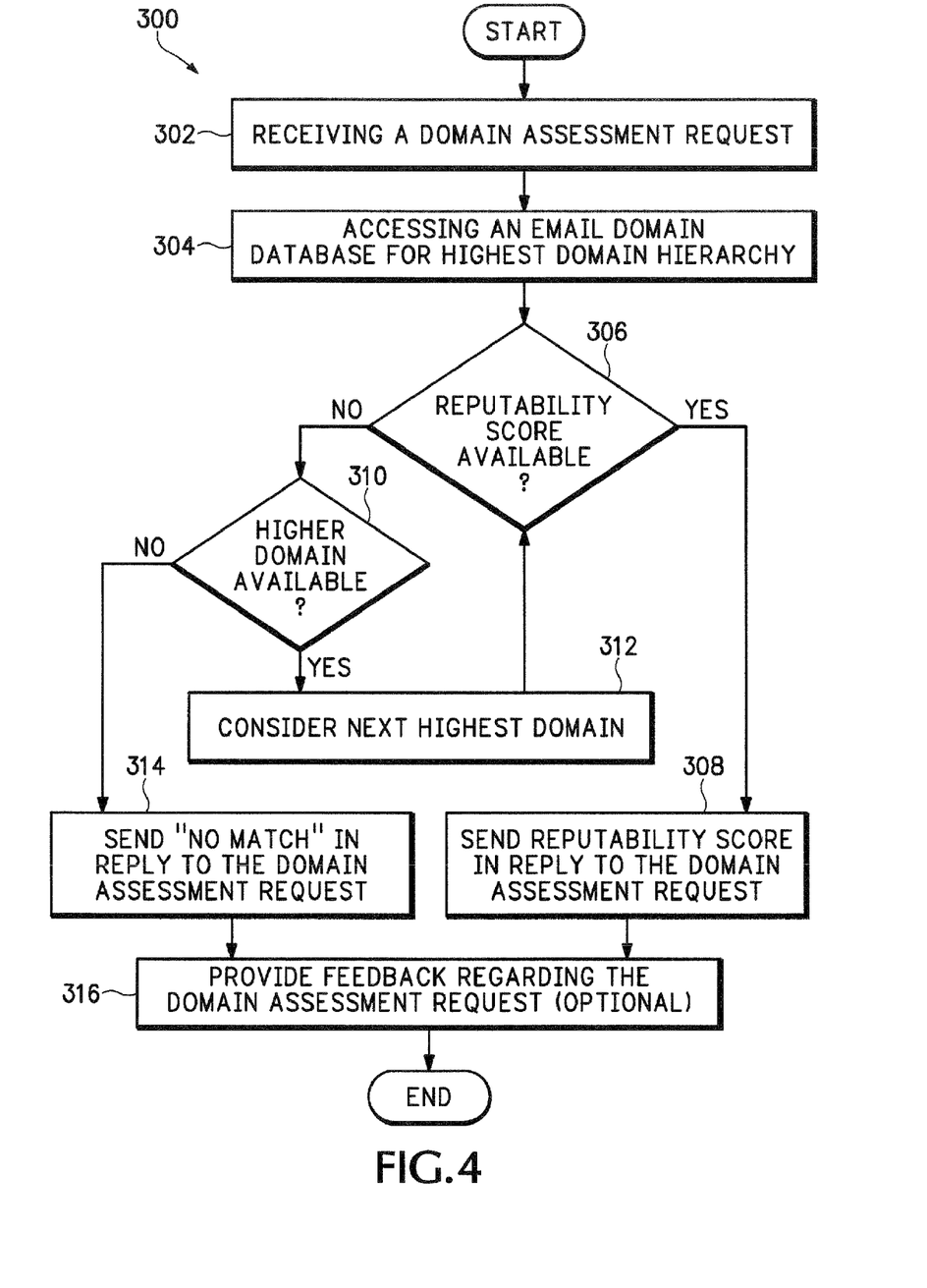
FIG. 4 depicts a flowchart of an example for hierarchical assessment of email reputability.

FIG. 4 explains in more detail how hierarchical domain information is used to determine reputability scores. The modules shown in FIG. 4 may be reordered, or arranged for serial or parallel execution as appropriate. Referring to FIGS. 1 and 4, the flowchart 300 begins at module 302 where a domain assessment request 120 is received. The domain assessment request 120 may include, for example, an email address, a list of email addresses, a domain, a list of domains, an entity, or some other data that a system can use to provide a reputability score and/or other information 122.

The flowchart 300 continues to module 304 where an email domain database is accessed for a highest domain hierarchy. The highest domain of an email address is typically everything after the '@' character. However, in an embodiment that includes providing reputability information for a specific email address (e.g., Jeremy@companyA.com), the highest "domain" could be considered the entire email address itself. Notably, an email address, strictly speaking, is not a "domain," but the applicability of this technique should be nevertheless apparent.

In the example of FIG. 4, the flowchart 300 continues to decision point 306 where it is determined whether a reputability score is available for the highest "domain." If it is determined that a reputability score is available for the "domain" (306-Y), the flowchart 300 continues to module 308 where the reputability score is sent in response to the domain assessment request. Additional information may be sent with (or, in an alternative embodiment, instead of) the reputability score 122, such as text identifying the owner of the email address or domain, or text characterizing the email address or domain.

If it is determined that a reputability score is not available for the "domain" (306-N), the flowchart 300 continues to module 310 where it is determined whether a next higher "domain" is available. In an embodiment where an email address is treated as the highest "domain," the next higher domain will be, in a typical implementation, the value after @. In an embodiment where the highest domain is the actual domain, the next higher domain will be the value after the first dot (.) following @. In any case, at each subsequent iteration, a next domain or super-domain is considered. Each domain level may be differentiated by the period "." separating each domain extension or sub-domain. A domain need not appear in quotes to cover the embodiment wherein an email address is treated as the highest level "domain".

If it is determined that a next higher domain is available (310-Y), then the flowchart 300 continues to module 312 where the next higher domain is considered. The flowchart 300 then loops back to decision point 306 where it is determined whether a reputability score is available for the next higher domain, and the flowchart 300 continues as described previously. If, on the other hand, it is determined that a next higher domain is not available (310-N), then the flowchart 300 continues to module 314 where "no match" is sent in reply to the domain assessment request 120. This means that no reputability score is available for the domain. However, there may be other information that is sent. For example, text associated with the owner of the email address or domain, or some other information. Also, a reputability score 122 may be sent based on traceability or association information as described in more detail below.

At some point, the flowchart 300 will reach module 308 (if a match is found) or module 314 (if no match is found). After either of these modules, the flowchart 300 may continue to optional module 316 where feedback 126 is provided regarding the domain assessment request. In this way, a manager can learn about domains that are queried frequently (recently or over time), do some research regarding the frequently queried domains, and update any relevant databases in accordance with the feedback. After the domain assessment request has been responded to, and other actions taken, if appropriate, the flowchart 300 ends.

Traceability/Association

Consider the email address "jeremy@companyA.com," which denotes that the owner of this address is an employee of or somehow associated with company A. As with this email address, every domain is going to have certain properties, and will distribute email addresses in a particular way, thus there is no global generalization that can be made for all email address domains. Advantageously, the email domain database 104 facilitates cataloging the properties of each domain name entry, specifically regarding how email addresses of that domain are assigned reputability scores.

Take for example, an email address with the domain "harvard.edu". This domain indicates that its owner is probably a student, alumni, contractor, or employee of Harvard University. The "edu" domain is associated with educational institutions that are required to satisfy different criteria before using the "edu" domain. More stringent qualifications are generally associated with the "edu" domain than required for the "com" domain. Therefore, domains under "edu" may be assigned higher reputability scores than domains under the "com" domain.

Further, any user registering an email address under "harvard.edu" may be required to go through a more rigorous and traceable registration process than other "com" email registrations. For example, a user using the email address "billjohnson@alum.harvard.edu" may be required to be an alumni of Harvard University. Accordingly, the user would likely be traceable through the alumni records at Harvard University and have a higher reputation for being associated with Harvard University.

Further, the user of "billjohnson@alum.harvard.edu" may have more accountability than users of other email addresses. For example, if the user conducts illicit or unacceptable behavior using the email address "billjohnson@alum.harvard.edu", then not only would the email address be subject to removal by the university but the user could also be subject to discipline or removal from the university alumni association. Thus, this email address may be assigned a relatively high reputability score since the actual identify of the user with this email domain is highly traceable and identifiable and user accountability is relatively high.

Similarly, an email address with the domain "google.com" may indicate that its owner is an employee of Google. Thus, the user of the email address "jillsmith@google.com" is likely to be traceable through Google employee records and accountable to Google management for certain activities related to the email address. In this example, internet addresses using the "google.com" domain may be assigned a relatively high reputability score (based on the traceability aspect as well as the association component).

Conversely, an email address with the domain "gmail.com" indicates very little and only shows that its owner registered for a free email account at Google's GMail web service. It could be easy for vandals or spammers to use readily available email addresses, such as a gmail.com address or an address from an unknown domain, that they can use a few times and then never use again. If used carefully, these email addresses are difficult to trace back to a real, human identity.

The user of the Gmail web service may have entered false personal information from a relatively non-intrusive and much less stringent email address registration process. Accordingly, these email addresses may be assigned relatively low reputability scores. Individuals are more likely to behave responsibly when their actions are traceable back to and associated with a real human-being or organization. Reputability scores may be assigned according to these traceable and non-traceable characteristics of the email domain.

Figure 5:
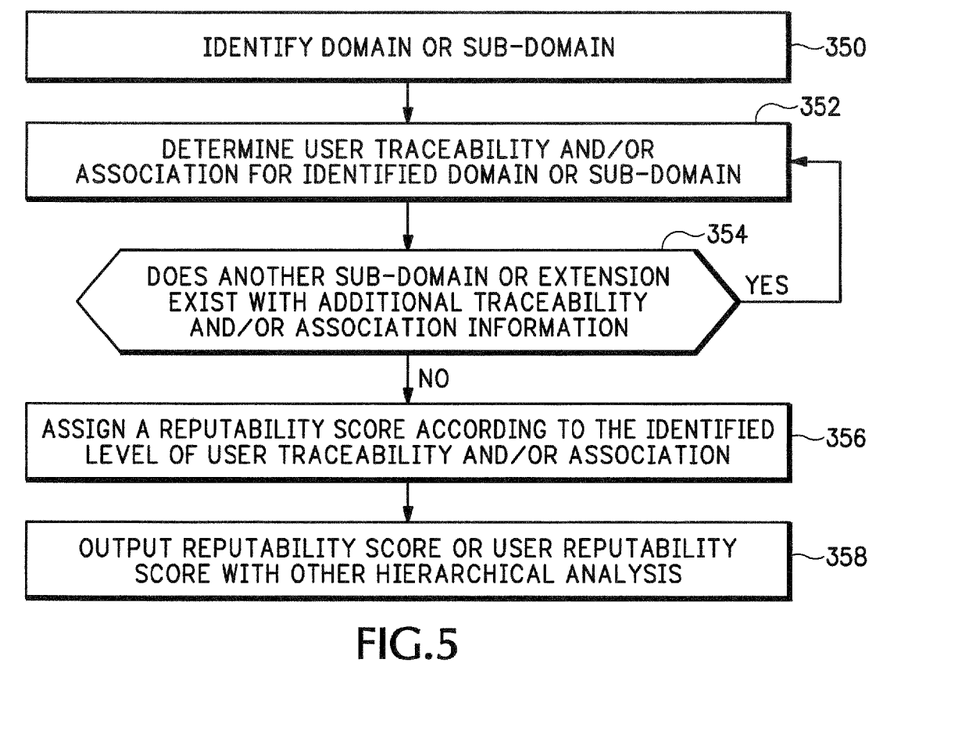
FIG. 5 depicts a flowchart of an example for accessing email reputability according to user traceability or association.

FIG. 5 describes the user traceability and association scheme in more detail. In operation 350, the search engine 110 in FIG. 1 identifies a domain or sub-domain for reputability analysis. The server 108 in operation 352 determines if the domain or sub-domain is traceable to a particular user and/or weather there is some level of traceability associated with the domain or sub-domain. For example, the search engine 110 may identify domains used by company employees or domains used by college alumni.

The server 108 in operation 354 determines if other sub-domains or extensions exist for the email address that may provide additional traceability or association information. For example, an email address "billjones@staff.chemistrydepartment.stateuniversity.edu" may be more traceable to a particular human-being than the email address "bill@stateuniversity.edu" and also have a much more specific association. Accordingly, the additional information provided in the first email address may be associated with a higher traceability and association than the second email address. The server 108 continues to parse through the email address until no further traceability information can be identified.

A reputability score 122 is assigned to the email address in operation 356 according to the traceability and association information. The reputability score 122 is then either output to the client 106 or further processed by the server 108 for other hierarchical analysis as described above in FIGS. 2-4.

Referring to FIGS. 1, 2, and 5, the email domain database 104 may include additional traceability, and association information 136 about a domain. For example, the email domain database 104A may include a description 136 associated with "companyA.com" that "email addresses in this domain are used exclusively by company A employees." This traceability and association information 136 could be provided to the client 106 in addition to or instead of a reputability score 122. The accountability and association information 136 could be in the form of a text description or could be supplied in the form of a traceability/association score. The domain search engine 110 may use traceability/association information 136 to automatically generate a traceability/association score or use the information 136 to adjust or weight a previously determined reputability score 122.

In this way, the client 106, when querying "jeremy@companyA.com" would know, for example, that "jeremy@companyA.com" is likely to be owned by a company A employee in contrast to "joe@yahoo.com", which is likely not owned by a Yahoo! employee. Emails "@yahoo.com" are part of a free web-based email service offered by Yahoo! to the general public. Most Yahoo employees in the U.S. have an official work email address ending in "yahoo-inc.com". Thus, this employee domain traceability/association information 136 notifies the server 108 of another aspect of domain reputability.

In another non-limiting embodiment, public users could post information 134 about a particular email domain 140A that might be relevant to another user that uses the system to look up an email address. For example, a user might post information 134 about "companyA.com" indicating "Email addresses in this domain are used exclusively by company A employees and contractors." In this case, the system 100 in FIG. 1 may be self-referencing in order to allow only those public users with a high enough reputability score to post information about other domains, email addresses, or entities, if applicable.

Filtering

The client 106 in FIG. 1 uses the domain filtering engine 112 to determine whether the reputability score 122 is adequate for a particular purpose. For example, if the client 106 includes a spam filter 124, the spam filter may be set to delete emails that have a reputability score of less than, for example, 30. Those emails that are included in a spam whitelist may be excluded from the filtering and emails that are included in a spam blacklist may be included in the filtering. The emails with a reputability score of less than 80 are sent to a spam folder.

The client 106 could be associated with a wiki that allows posting by users with a reputability score of over 70 without review, reviews attempted posts by users with a reputability score of 40-69 before posting, and does not allow posts by users with a reputability score of less than 40.

The client 106 could be associated with a blog that allows comments to be posted in association therewith. Users with a reputability score of 70 may be allowed to post comments without review, and commentators with a reputability score of 50-69 could be asked to provide additional information about themselves to increase their apparent reputability.

The client 106 could be associated with a forum that allows posting by users with a reputability score of 60 or higher or the client 106 could be associated with a community web site that allows users with reputability scores of 60 or more to send messages.

The client 106 could be associated with a social network that allows posting on someone's page by users with a reputability score of 50 or higher, and users with reputability scores of 40-49 can ask the page owner for permission to post. The client 106 could alternatively be associated with a social network that allows posting of messages, in general, by anyone with a reputability score of 60 or higher.

The client could be an email client that uses reputability scores to mitigate against spam. Emails with more trustworthy domains are treated differently according to various filtering and spam-reduction/elimination techniques.

The client could be associated with e-commerce. Emails from more trustworthy domains are more likely to be from trustworthy customers. This information can be used to prevent fraud in e-commerce transactions.

Other client examples might include: payment companies (like paypal), mobile phone carriers and other mass B2C companies (both to protect against fraud and a way of determining high-value customers), etc.

The applicability and settings are too numerous to exhaustively list, and the reputability scores actually used and other desired settings may be implementation-specific. The teachings provided herein should provide sufficient description to facilitate implementation by one of skill in the relevant art without undue experimentation.

In an optional embodiment, the server 108 may provide feedback 126 to the admin 102. In another alternative, the admin 102 may pull feedback 126, rather than have the feedback pushed from the server 108. In any case, feedback 126 associated with domain lookups may be provided to the admin 102. This may enable a human manager or a computer to ascertain which email domains on which to focus attention. For example, the manager or computer can query email domains that are frequently requested but that do not yet have reputability scores attached to them within the email domain database 104. The manager or computer can then manually or automatically research the domain and attach the appropriate rating.

FIG. 6 depicts a computer system 500 suitable for implementation of the admin 102, the client 106, and the server 108 in FIG. 1. The computer system 500 includes a computer 502, I/O devices 504, and a display device 506. The computer 502 includes a processor 508, a communications interface 510, memory 512, display controller 514, non-volatile storage 516, and I/O controller 518. The computer 502 may be coupled to or include the I/O devices 504 and display device 506.

The computer 502 interfaces to external systems through the communications interface 510, which may include a modem or network interface. The communications interface 510 can be considered to be part of the computer system 500 or a part of the computer 502. The communications interface 510 can be an analog modem, ISDN modem, DSL modem, cable modem, token ring interface, satellite transmission interface (e.g. "direct PC"), or other interfaces for coupling a computer system to other computer systems. Although conventional computers typically include a communications interface of some type, it is possible to create a computer that does not include one, thereby making the communications interface 510 optional in the strictest sense of the word.

The processor 508 may include, by way of example but not limitation, a conventional microprocessor such as an Intel Pentium microprocessor or Motorola power PC microprocessor. While the processor 508 is a critical component of all conventional computers, any applicable known or convenient processor could be used for the purposes of implementing the techniques described herein. The memory 512 is coupled to the processor 508 by a bus 520. The memory 512, which may be referred to as "primary memory," can include Dynamic Random Access Memory (DRAM) and can also include Static RAM (SRAM). The bus 520 couples the processor 508 to the memory 512, and also to the non-volatile storage 516, to the display controller 514, and to the I/O controller 518.

The I/O devices 504 can include a keyboard, disk drives, printers, a scanner, and other input and output devices, including a mouse or other pointing device. For illustrative purposes, at least one of the I/O devices is assumed to be a block-based media device, such as a DVD player. The display controller 514 may control, in a known or convenient manner, a display on the display device 506, which can be, for example, a cathode ray tube (CRT) or liquid crystal display (LCD).

The display controller 514 and I/O controller 518 may include device drivers. A device driver is a specific type of computer software developed to allow interaction with hardware devices. Typically this constitutes an interface for communicating with the device, through a bus or communications subsystem that the hardware is connected to, providing commands to and/or receiving data from the device, and on the other end, the requisite interfaces to the OS and software applications.

The device driver may include a hardware-dependent computer program that is also OS-specific. The computer program enables another program, typically an OS or applications software package or computer program running under the OS kernel, to interact transparently with a hardware device, and usually provides the requisite interrupt handling necessary for any necessary asynchronous time-dependent hardware interfacing needs.

The non-volatile storage 516, which may be referred to as "secondary memory," is often a magnetic hard disk, an optical disk, or another form of storage for large amounts of data. Some of this data is often written, by a direct memory access process, into memory 512 during execution of software in the computer 502. The non-volatile storage 516 may include a block-based media device. The terms "machine-readable medium" or "computer-readable medium" include any known or convenient storage device that is accessible by the processor 508.

The computer system 500 is one example of many possible computer systems which have different architectures. For example, personal computers based on an Intel microprocessor often have multiple buses, one of which can be an I/O bus for the peripherals and one that directly connects the processor 508 and the memory 512 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 512 for execution by the processor 508. A Web TV system, which is known in the art, is also considered to be a computer system, but it may lack some of the features shown in FIG. 6, such as certain input or output devices. A typical computer system will usually include at least a processor, memory, and a bus coupling the memory to the processor.

The computer system 500 may be controlled by an operating system (OS). An OS is a software program-used on most, but not all, computer systems—that manages the hardware and software resources of a computer. Typically, the OS performs basic tasks such as controlling and allocating memory, prioritizing system requests, controlling input and output devices, facilitating networking, and managing files. Examples of operating systems for personal computers include Microsoft Windows®, Linux, and Mac OS®. Delineating between the OS and application software is sometimes rather difficult. Fortunately, delineation is not necessary to understand the techniques described herein, since any reasonable delineation should suffice.

The lowest level of an OS may be its kernel. The kernel is typically the first layer of software loaded into memory when a system boots or starts up. The kernel provides access to various common core services to other system and application programs.

As used herein, algorithmic descriptions and symbolic representations of operations on data bits within a computer memory are believed to most effectively convey the techniques to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer that manipulates and transforms data represented as physical (electronic) quantities within the computer system's registers and memories into other data similarly represented as physical quantities within the computer system memories or registers or other such information storage, transmission or display devices.

An apparatus for performing techniques described herein may be specially constructed for the required purposes, or it may comprise a general purpose computer selectively activated or reconfigured by a computer program stored in the computer. Such a computer program may be stored in a computer readable storage medium, such as, by way of example but not limitation, read-only memories (ROMs), RAMs, EPROMs, EEPROMs, magnetic or optical cards, any type of disk including floppy disks, optical disks, CD-ROMs, DVDs, and magnetic-optical disks, or any known or convenient type of media suitable for storing electronic instructions.

The algorithms and displays presented herein are not inherently related to any particular computer architecture. The techniques may be implemented using any known or convenient programming language, whether high level (e.g., C/C++) or low level (e.g., assembly language), and whether interpreted (e.g., Perl), compiled (e.g., C/C++), or Just-In-Time (JIT) compiled from bytecode (e.g., Java). Any known or convenient computer, regardless of architecture, should be capable of executing machine code compiled or otherwise assembled from any language into machine code that is compatible with the computer's architecture.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

The invention claimed is:

1. A method comprising:
receiving an assessment request associated with a domain;
accessing a database to find a match for the domain, wherein the database contains at least some hierarchical domains with multiple hierarchical domain levels that are each assigned different reputability scores, and wherein at least some lower child domain levels in the hierarchical domains are assigned higher reputability scores indicating more reputability and parent domain levels of the child domain levels in the same hierarchical domains are assigned lower reputability scores indicating less reputability;
deriving a reputability score by identifying one of the hierarchical domains in the database that matches the domain associated with the assessment request;
identifying the reputability score for a lowest one of the hierarchical domain levels for the identified one of the hierarchical domains that matches the domain;
determining whether a first domain level matches the domain in the assessment request;
using a first reputability value associated with the first domain level for deriving the reputability score when the first domain level matches the domain;
determining whether a second sub-domain level of the first domain level matches the domain; and
using a second reputability value associated with the second sub-domain level associated with a higher reputability than the first reputability value for deriving the reputability score when the second sub-domain level matches the domain in the assessment request; and
sending the reputability score in reply to the assessment request.

2. The method of claim 1, further comprising using a higher reputability value for each subsequently lower sub-domain level that matches the domain.

3. The method of claim 1, further comprising:
allowing users with emails addresses having domains with reputability scores within a first high range to post messages on a web site without approval from a web site administrator;
allowing users with emails addresses having domains with reputability scores within in a second middle range to post messages on the web site only with approval from the web site administrator; and
preventing users with emails addresses having domains with reputability scores within a third low range from posting messages on the web site.

4. The method of claim 1, further comprising providing, in reply to the assessment request, additional information associated with the domain and adjusting the reputability score for the domain according to the additional information.

5. The method of claim 4, further comprising accepting the additional information associated with the domain from a manager.

6. An article of manufacture including a computer readable medium having instructions stored thereon that, in response to execution by a computing device, cause the computing device to perform operations, comprising:
a processor on the computing device identifying traceability or association information associated with a domain in an assessment request, wherein the traceability or association information indicates an amount of personal information or a qualification level required for obtaining an email address for the domain;
deriving a reputability score for the domain according to the identified traceability and association information, wherein the reputability score is higher indicating a higher reputability when more personal information or a higher qualification level is required for obtaining the email address for the domain and the reputability score is lower indicating a lower reputability when less personal information or a lower qualification level is required for obtaining the email address for the domain;
determining whether a first domain level in a hierarchical domain matches the domain in the assessment request;
using a first reputability value associated with the first domain level for deriving the reputability score when the first domain level matches the domain;
determining whether a second sub-domain level of the first domain level in the hierarchical domain matches the domain in the assessment request; and
using a second reputability value associated with the second sub-domain level associated with a higher reputability than the first reputability value for deriving the reputability score when the second sub-domain level matches the domain in the assessment request.

7. The article of manufacture according to claim 6 wherein:
the reputability score is higher when the domain is used by a company and email addresses for the domain are only assigned to employees of the company; and
the reputability score is lower when the domain is used as a public email service and email addresses for the domain are assigned to anyone that registers with the public email service.

8. The article of manufacture according to claim 6 wherein the reputability score is higher when the domain requires users to provide credit card information or personal identification information and the reputability score is lower when the domain does not require users to provide credit card information or personal identification information.

9. The article of manufacture according to claim 6 wherein:
the reputability score derived for the domain is higher when email addresses for the domain are only assigned to members of an organization associated with the domain; and
the reputability score derived for the domain is lower when email addresses for the domain are assigned to non-members of the organization associated with the domain.

10. A system, comprising:
a database configured to store domain hierarchies; and
a hierarchical domain search engine, configured to:
analyze the domain hierarchies in the database to determine a reputability score for a domain associated with a domain assessment request;
determine whether a first domain level in at least one of the domain hierarchies matches the domain associated with the domain assessment request;
use a first reputability value associated with the first domain level for determining the reputability score when the first domain level matches the domain;
determine whether a second sub-domain level of the first domain level matches the domain associated with the domain assessment request; and
use a second reputability value associated with the second sub-domain level associated with a higher reputability than the first reputability value for determining the reputability score when the second sub-domain level matches the domain associated with the domain assessment request.

11. The system of claim 10 wherein the hierarchical domain search engine configured to determine the reputability score according to a longest matching domain extension level in the database.

12. The system of claim 10, further comprising a domain filtering engine that uses the reputability score to determine permissions associated with the domain.

13. The system of claim 10, wherein the hierarchical domain search engine is configured to adjust the reputability score according to traceability and association information associated with the domain.

14. The system of claim 13 wherein the traceability and association information identifies domains that require membership in an organization operating the domain.

15. The system of claim 13 wherein the traceability and association information identifies domains that require users to enter or disclose personal address information or credit card information prior to using a domain email address.

16. The system of claim 13, wherein the traceability and association information identifies domains that are used by employees of a company where the company operates the domain.

17. The system of claim 10, wherein the hierarchical domain search engine is configured to provide feedback to an administration system regarding the domain assessment request.

18. An apparatus for assessing reputability of email, comprising:
a memory configured to store at least some hierarchical domains that include a first domain level and a second sub-domain level of the first domain level, wherein at least some of the first and second domain levels of the same hierarchical domains have different associated reputability values; and
a processing device configured to access the memory to derive a first lower reputability value for a domain when a reputability value for a sub-domain level of the domain is not found in the memory and to derive a second higher reputability value for the domain when a reputability value for the sub-domain level of the domain is found in the memory, wherein the processing device is configured to:
determine whether the first domain level in one of the hierarchical domains matches a domain for assessment;
use a first reputability value associated with the first domain level for deriving a reputability score when the first domain level matches the domain;
determine whether a second sub-domain level of the first domain level matches the domain; and
use a second reputability value associated with the second sub-domain level associated with a higher reputability than the first reputability value for deriving the reputability score when the second sub-domain level matches the domain for assessment.

19. The apparatus according to claim 18, further comprising:
allowing users with email addresses having domains with reputability scores within a first high range to access a web site without approval from a web site administrator;
allowing users with email addresses having domains with reputability scores within in a second middle range to access the web site only with approval from the web site administrator; and
preventing users with emails addresses having domains with reputability scores within a third low range from accessing the web site.

20. The apparatus according to claim 18, wherein the processing device is configured, for at least some of the hierarchical domains, to increase the reputability score for each additional sub-domain level for the same hierarchical domains found in the memory.

21. The apparatus according to claim 18, wherein the apparatus is associated with one of the group consisting of:
a wiki,
a blog,
a forum,
a web page,
a social network,
a community web site,
an email client, or
an e-commerce site.

22. The apparatus according to claim 18, further comprising, a means for providing feedback regarding the hierarchical domains in the memory.

23. The apparatus according to claim 18, further comprising, a means for providing additional information associated with the domain, when a reputability value for the second sub-domain level is not found in the memory.

* * * * *